United States Patent [19]

Ellinger

[11] 3,844,357
[45] Oct. 29, 1974

[54] DEPTH CONTROL FOR FARM IMPLEMENT
[75] Inventor: Earl H. Ellinger, Crookston, Minn.
[73] Assignee: DEE, Inc., Crookston, Minn.
[22] Filed: Oct. 18, 1973
[21] Appl. No.: 407,634

[52] U.S. Cl. .................................................. 172/4
[51] Int. Cl. ......................................... A01b 63/111
[58] Field of Search ......................... 172/4, 4.5, 7, 9

[56] References Cited
UNITED STATES PATENTS
| | | | |
|---|---|---|---|
| 2,752,835 | 7/1956 | Wright | 172/4 |
| 2,755,721 | 7/1956 | Rusconi | 172/4 |
| 3,190,362 | 6/1965 | Allgaier et al. | 172/4 |
| 3,513,916 | 5/1970 | Hyler | 172/4 |

Primary Examiner—Stephen C. Pellegrino
Attorney, Agent, or Firm—H. Dale Palmatier; James R. Haller

[57] ABSTRACT

A hydraulic control for automatically maintaining the height of a frame-mounted farm implement with respect to ground level. The frame is directed to be propelled by a tractor, the latter having a hydraulic system for feeding hydraulic fluid under pressure into a first or a second hydraulic line. The frame includes wheels, swingably mounted to the frame, a hydraulic cylinder for swinging the wheels to change the vertical distance between the frame and the wheels, and a control valve having associated check valves and communicating with the first and second tractor hydraulic lines. The control valve is connected through a pair of valve hydraulic lines to the hydraulic cylinder and includes an external switch having raise and lower positions, the valve communicating the first tractor hydraulic line with one or the other of the valve hydraulic lines depending upon the position of the valve switch to raise or lower the implement frame with respect to the wheels. Pivotally carried by the frame is a sensing shoe adapted to ride across the surface of the ground to sense changes in the height of the frame above the ground, the sensing shoe being linked to the valve switch to operate the switch. Bypass lines connect the tractor hydraulic lines, through check valves, directly to the valve hydraulic lines so that reversal of the direction of flow of hydraulic fluid in the tractor hydraulic lines causes hydraulic fluid to bypass and hence override the control valve to raise the implement frame with respect to the wheels.

9 Claims, 6 Drawing Figures

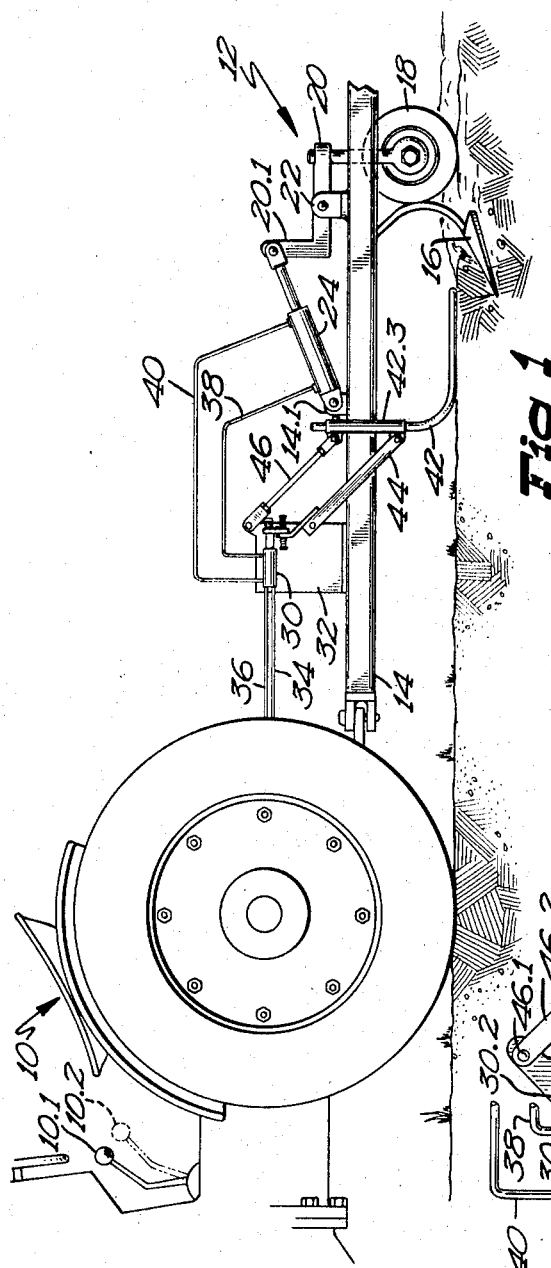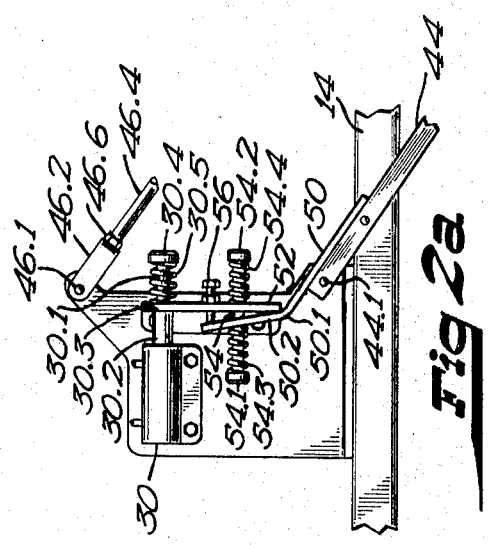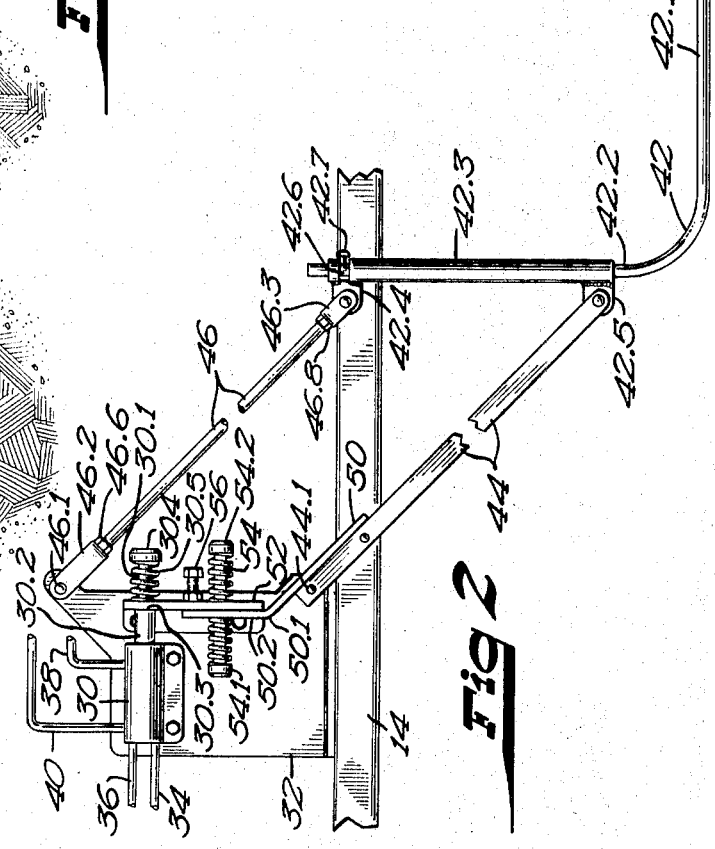

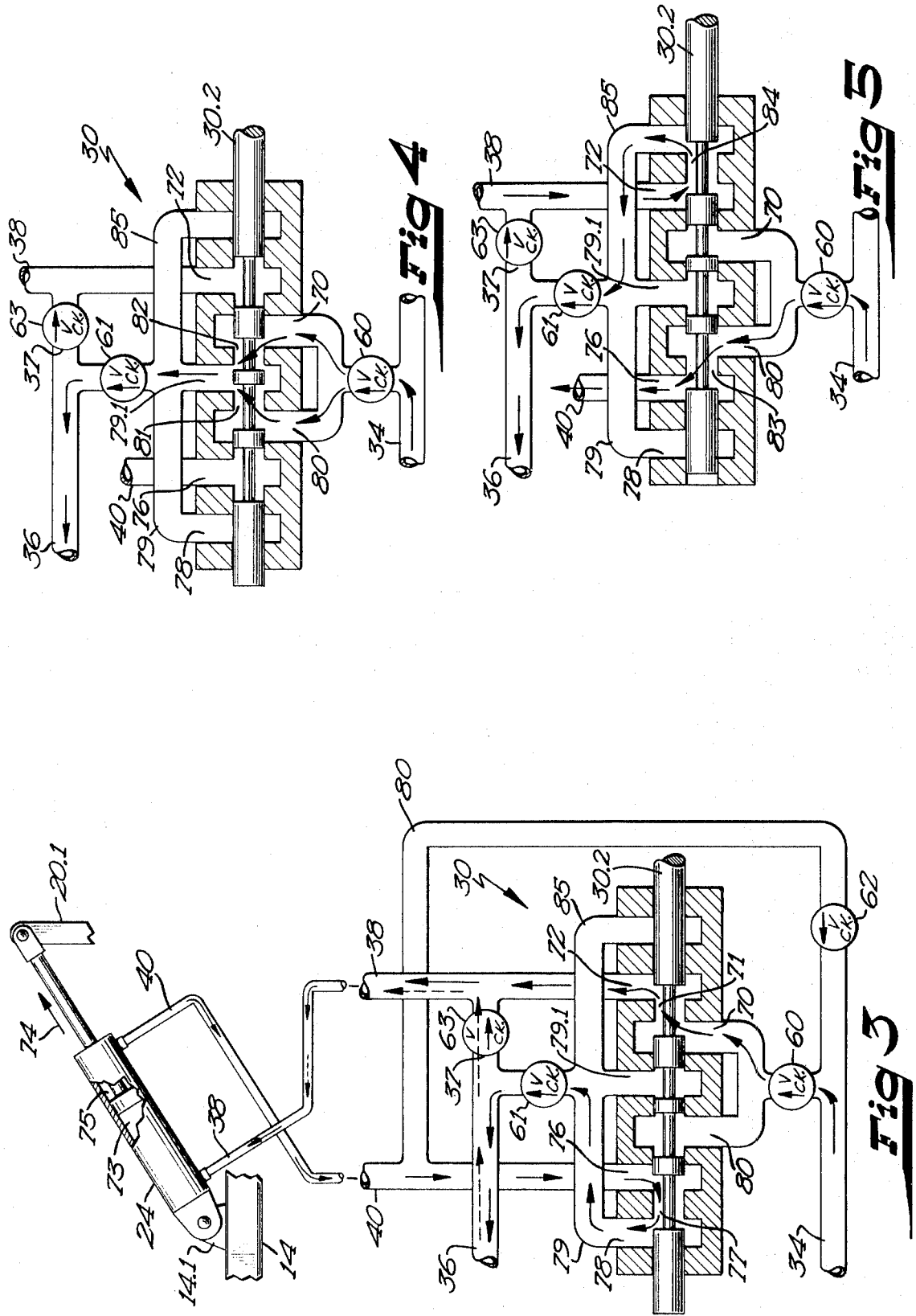

DEPTH CONTROL FOR FARM IMPLEMENT

BACKGROUND OF THE INVENTION

Farm implements are often mounted on a frame with wheels, the frame being propelled by a tractor across fields to be plowed or otherwise worked. When flat or gently rolling land is thus worked, and the ground is of a uniformly dry consistency so that neither the tractor wheels nor the wheels of the frame sink into the ground to any appreciable extent, the penetration of the plow or other tool into the ground will be substantially constant. If, on the other hand, the soil to be worked is of varying consistency so that it is soft and wet in some areas and harder and drier in others, the wheels of the tractor and of the implement frame tend to sink more easily into the soft, wet soil and hence cause the penetration of the tool into the ground to be increased beyond the desired depth. A simple and reliable system for automatically maintaining a constant depth of penetration into the ground of a farm implement is much to be desired.

BRIEF DESCRIPTION OF THE INVENTION

The present invention relates to a control for automatically maintaining the height of a frame-mounted implement with respect to ground level, the implement being mounted on an implement frame which has wheels for carrying it along the ground. The implement frame may be drawn behind the tractor, as illustrated, or may be mounted at the tractor front or sides as desired. The tractor has a hydraulic pump with a selector and is adapted to provide hydraulic fluid under pressure to a first or a second tractor hydraulic line in correspondence to positioning of the selector in forward or reverse positions, the hydraulic fluid being returned through the second or first tractor hydraulic line, respectively. The control comprises a double-acting hydraulic cylinder adapted to raise and lower the frame with respect to the frame wheels, and a control valve mounted to the frame and in flow communication with the first and second tractor hydraulic lines. The control valve communicates with the hydraulic cylinder through a pair of valve hydraulic lines and has a movable switch with raise and lower positions which respectively communicate the hydraulic fluid in the first hydraulic tractor line through the valve with one or the other of the valve hydraulic lines to raise or lower the frame with respect to the frame wheels. A ground-sensing shoe is carried by the frame and is adapted to slide across the surface of the ground and to move vertically with respect to the frame when the distance of the frame from the ground varies. Vertical movement of the sensing shoe is transmitted to the valve switch by motion-transmitting means, moving the switch between its raise and lower positions. A first bypass line communicates the second tractor hydraulic line through a check valve directly with the one valve hydraulic line, and a second bypass line communicates the other valve hydraulic line directly to the first tractor line through a check valve. Movement of the selector to the reverse position causes hydraulic fluid under pressure to bypass the control valve and to energize the hydraulic cylinder, raising the frame with respect to the wheels for transporting the tool-laden frame.

In a preferred embodiment, the motion-transmitting means for transmitting vertical movement of the sensing shoe to the valve switch includes a resilient coupling which is adapted to absorb momentary upward and downward movements of the sensing shoe as may be caused by encounters with a ground obstruction such as a rock or with a fissure.

BRIEF DESCRIPTION OF THE DRAWING

FIG. 1 is a partial side view of a tractor pulling a farm implement frame equipped with a depth control of the invention;

FIG. 2 is a detailed, broken-away view of the controller shown in FIG. 1;

FIG. 2A is a broken-away view of a portion of the controller shown in FIG. 2;

FIG. 3 is a schematic diagram of the control valve and hydraulic system of the invention, the valve being shown in position for raising the implement frame with respect to the wheels; and FIGS. 4 and 5 are schematic representations of the valve shown in FIG. 3, the hydraulic system being partially broken away, and representing the valve in its intermediate (neutral) position and in position causing the frame to be lowered with respect to the wheels, respectively.

DETAILED DESCRIPTION OF THE PREFERRED EMBODIMENT

Referring to FIG. 1, a tractor 10 having a hydraulic system is depicted as pulling a farm implement frame designated generally as 12, the latter including a generally horizontal strut 14, an earth-working tool 16 depending from the strut, wheels 18, and a connecting bar 20 swingably connected to the frame at 22 and carrying at its lower end the axle for the wheels 18. The bar 20 has an upwardly extending end 20.1 on the other side of the pivot 22 such that movement of the end 20.1 of the bar about the pivot causes the vertical distance between the frame 14 and the wheels 18 to change. A hydraulic cylinder 24 is pivotally mounted at 14.1 to the frame and connects the frame to the end 20.1 of the rod such that extension or retraction of the cylinder 24 causes the bar 20 to pivot about its pivot point 22 and thus raise or lower the frame with respect to the wheels.

A control valve 30 is attached to a mounting bracket 32 which in turn is mounted to the frame strut 14. Tractor hydraulic lines 34 and 36 connect the valve with the hydraulic system of the tractor 10 so as to supply to the valve a continuous source of hydraulic fluid under pressure, the fluid normally entering the valve through line 34 and returning through line 36. Valve hydraulic lines 38 and 40 connect the control valve 30 with the hydraulic cylinder 24 such that hydraulic fluid under pressure which is admitted by the valve to the line 38 causes the hydraulic cylinder 24 to extend and thus raise the frame with respect to the wheels. Admission of hydraulic fluid under pressure from the valve into line 40, on the other hand, causes the hydraulic cylinder 24 to retract and thus lowers the frame with respect to the wheels 18.

A generally L-shaped ground-sensing shoe 42 having a lower, horizontal end 42.1 has an upwardly extending shank 42.2 which is rotatably carried within a sleeve 42.3 having spaced, upwardly extending ears 42.4, 42.5. Near its upper end, the sleeve has a cut-away section adapted to accomodate a locking collar 42.6 which fits around the shank 42.2 of the ground-sensing shoe and which is held to the shoe by means of locking bolt 42.7. The locking collar prevents the ground-sensing shoe from vertical movement within the sleeve, but permits the shoe to rotate within the sleeve so that the shoe may maintain its orientation with respect to the line of travel when the frame is being drawn in a curved path by the tractor. A pair of spaced, parallel connecting links 44, 46 are pivotally connected at their upper ends to the bracket 32 at pivot points 44.1 and 46.1, respectively. The upper connecting link 46 is provided with short tubular ends 46.2, 46.3 into which are threaded the ends of a connecting rod 46.4. The upper connecting link 46 may thus be adjusted to length by turning the threaded rod 46.4 within the ends 46.2 and 46.3 so as to cause the lower end 42.1 of the ground-sensing shoe to lie flat against the ground. The threaded rod 46.4 is then locked against further rotation by means of locking nuts 46.6, 46.8. The lower ends of the connecting links 44 and 46 are respectively pivotally connected to the ears 42.5 and 42.4 of the shoe holder 42.3. It will thus be appreciated that the parallel connecting links 44, 46 permit the ground-sensing shoe 42 to move upwardly and downwardly with respect to the mounting bracket 32 while maintaining the lower end 42.1 of the shoe oriented flushly against the ground and in alignment with the direction of travel of the implement 12.

A motion-transmitting arm 50 is rigidly affixed to the upper end of the connecting link 44 as by welding, and is bent near its midportion 50.1 to provide an upwardly extending shank 50.2 having a mounting hole. The shank 50.2 bears against a connector rod 52 having a mounting hole aligned with the hole in the shank 50.2. Through the aligned holes passes a pin 54 having enlarged ends 54.1, 54.2. Compression springs 54.3, 54.4 are mounted respectively between the enlarged end 54.1 and the outer surface of upright shank 50.2, and between the enlarged end 54.2 and the outer surface of the connector rod 52, the compression springs urging the shank 50.2 and the rod 52 into facing engagement. A locking stud, which may take the form of a threaded bolt 56, is threaded through the rod 52 so that the end of the bolt comes into contact with the inner surface of the upwardly extending shank 50.2 such that continued turning of the bolt 56 tends to separate the shank 50.2 from the rod 52 against the pressure of compression springs 54.3 and 54.4, as shown best in FIG. 2A. A locking nut 56.1 serves to lock the bolt 56 in the desired position.

With reference to FIG. 2, the upper end of the connector rod 52 is provided with an orifice through which passes the outwardly extending end 30.1 of the valve plunger 30.2. The valve plunger is movable through the body of the valve to switch the flow of hydraulic fluid through the valve, as will be more fully explained below. The valve plunger end 30.1 extends through the orifice in the connector rod and terminates in an enlarged head 30.4. A compression spring 30.5 is mounted between the connector rod and the enlarged head 30.4 of the valve plunger end to urge the connector rod against the shoulder 30.3 of the plunger to avoid slack in plunger movement.

As will be evident from the above description, vertical movement of the ground-sensing shoe 42 causes the connecting link 44 to swing about its pivot point 44.1, which in turn causes lateral movement of the upwardly extending shank 50.2 of the arm 50. The last-mentioned movement is transmitted to the connector arm 52 and thence to the valve plunger 30.2 to operate the valve. It is desired that the control of the invention be capable of "ignoring" such variations in ground level as may be caused by rocks, small fissures, or the like. When the shoe 42 encounters a rock, the shoe tends to bounce upwardly. Because of the inertia associated with the valve plunger and connector rod, these elements tend to resist the movement thereby imparted by the rapid movement of the upwardly extending shank 50.2. Rapid movements of the shank are accomodated by the compression springs 54.3 and 54.4, which springs permit the shank 50.2 to momentarily separate from the connector arm 52. The thus described resilient coupling between the ground-sensing shoe 42 and the valve plunger 30.2 protects the valve from rapid, jerky motion and causes the control of the invention to respond only to actual changes in the height of the frame 14 from the ground level. In addition, the compression springs 54.3 and 54.4 permit the upper end of the shank 50.2 to be separated from the connector arm 52 (as shown in FIG. 2A) by the locking stud 56, as when the control is set for the desired height of the frame 14 above the surface of the ground.

When the implement 12 encounters unusually soft ground, such that the wheel 18 tends to sink into the ground, the height of the frame 14 from the ground will be reduced. The ground-sensing shoe 42 as it rides on the surface of the ground will hence be forced in an upwardly direction, and this motion is transmitted through the above-described mechanism to cause the control valve plunger in FIG. 2 to move to the left. Such movement causes the valve to deliver hydraulic fluid under pressure through valve hydraulic line 38 and thence into the hydraulic cylinder 24 (FIG. 1), causing the cylinder to extend and causing the wheel 18 to move downwardly with respect to the frame 14, thus raising the frame from the surface of the ground. As the frame is thus raised, the ground-sensing shoe is lowered with respect to the frame and returns the valve to a neutral position when the frame has regained its original height from the ground. The automatic height adjustment thus afforded serves to maintain the earth-working tool 16 at a constant depth in the ground.

Referring now to FIGS. 3, 4 and 5, the control valve 30 comprises a valve body containing a plurality of openings and through which extends the valve plunger 30.2. The valve plunger includes a series of openings which are positioned to afford communication between preselected pairs of valve body openings, depending, of course, upon the position of the plunger within the valve. As noted above, hydraulic lines 34 and 36 provide communication between the valve and the hydraulic system of a tractor or the like, and hydraulic lines 38 and 40 provide communication between the valve and the hydraulic cylinder 24 which directly adjusts the height of the frame 14 with respect to the wheels 18. FIG. 3 shows the valve and the valve plunger in the raise position to cause the hydraulic cylinder 24 to extend and thus to increase the height of the frame 14 with respect to the wheels 18, and FIG. 5 shows the valve and valve plunger in the lower position to cause retraction of the hydraulic cylinder with consequent reduction in the height of the frame with respect to the wheels. FIG. 4 shows the valve and valve plunger in a neutral or intermediate position wherein no hydraulic fluid is admitted to the hydraulic cylinder 24. The solid line arrows in FIGS. 3–5 indicate the path of hydraulic fluid through the operating control valve.

In FIG. 3, hydraulic fluid under pressure is pumped from the tractor hydraulic system through hydraulic line 34 and thence through check valve 60 into valve body chamber 70. The fluid then passes through the opening 71 afforded by the the valve plunger into valve body chamber 72 and thence to hydraulic line 38 into the lower chamber 73 of the hydraulic cylinder 24, causing the piston rod of the cylinder to extend in the direction shown by the arrow 74. Hydraulic fluid contained within the upper chamber 75 of the hydraulic cylinder is forced outwardly through hydraulic line 40 into the valve body chamber 76, thence through the opening 77 provided by the valve plunger into valve body chamber 78, and thence through hydraulic line 79 and check valve 61 into hydraulic line 36 for return to the tractor hydraulic system. It may be observed that the pressure of the hydraulic fluid continously decreases as the fluid passes through the self-described system. For this reason, the pressure of the fluid in line 40 is less than that of the fluid entering through line 34. The pressure of the hydraulic fluid in bypass line 80 which directly joins lines 40 and 34 is thus less than the pressure in line 34, and the check valve 62 in the hydraulic line 80 thus remains closed. In similar fashion, the pressure in hydraulic line 38 is greater than that in line 36; hence, check valve 63 in the bypass line 37 directly joining hydraulic lines 36 and 38 remains closed.

When the ground-sensing shoe is at the desired height with respect to the implement frame so that no raising or lowering of the frame with respect to the wheel is desired, the valve is in the neutral or intermediate position shown in FIG. 4. In this figure, hydraulic fluid under pressure is received from the tractor hydraulic system through hydraulic line 34 and passes through check valve 60 into chambers 70,80, thence through the openings 81,82 afforded by the valve plunger and through check valve 61 into hydraulic line 36 for return to the hydraulic system of the tractor. It will be noted in FIG. 4 that the hydraulic lines 38 and 40 which lead to the hydraulic plunger 24 are sealed off by blockage of the valve body chambers 72 and 76 by the valve plunger.

Referring now to FIG. 5, it will be noted that the position of the valve plunger has been shifted again to the right to mirror a lowering of the ground-sensing shoe with respect to the frame. Hydraulic fluid under pressure enters the valve body chamber 80 through hydraulic line 34 and check valve 60, and thence passes through the opening 83 afforded by the valve plunger into the valve body chamber 76 and thence outwardly through hydraulic line 40 into the upper chamber 75 of the hydraulic cylinder 24, thus causing the cylinder to retract and lower the frame with respect to the wheels 18. The fluid in the lower chamber 73 of the hydraulic cylinder 24 passes downwardly through hydraulic line 38 into valve body chamber 72, thence through the opening 84 afforded by the valve plunger into hydraulic line 85 and thence through check valve 61 to exit from the valve through hydraulic line 36 for return to the hydraulic system of the tractor. As the implement frame is thus lowered, the ground-sensing shoe 42 travels upwardly with respect to the valve, thereby causing the valve plunger to move gradually to the left and to finally assume a neutral position when the correct height between the frame and the ground has been obtained.

By merely reversing the flow of hydraulic fluid from the tractor through the hydraulic lines 34 and 36, as by moving hydraulic control lever 10.1 from its solid line "forward" position to its dotted line "reverse" position 10.2 in FIG. 1, the frame may be raised to its maximum height with respect to the wheels 18 completely independently of the position of the control valve plunger and the sensing shoe, as when the equipment is prepared for transportation upon a highway. Referring to FIG. 3, the reverse flow path of hydraulic fluid is shown in dashed line arrows. Hydraulic fluid under pressure enters through hydraulic line 36, passes through check valve 63 into line 38, and thence passes upwardly into the chamber 73 of the hydraulic cylinder 24, causing the frame to raise with respect to the wheels. The hydraulic fluid passing through line 36 cannot enter line 79 or 85 because of the check valve 61. Moreover, hydraulic fluid from line 36 is prevented from escaping into the valve body through line 38 by the blockage of the chamber 80 and operation of check valve 60 (FIG. 3); by the blockage of chamber 72 (FIG. 4); and by the blockage of chambers 78 and 79.1 (FIG. 5), or operation of the check valve 60. The hydraulic fluid which exits from the chamber 75 of the hydraulic cylinder 24 passes into hydraulic line 40, thence into line 80 to completely circumvent the valve, and thence through check valve 62 and outwardly through line 34 for return to the tractor hydraulic system.

Movement of the hydraulic control lever 10.1 to a neutral position (not shown) intermediate the "forward" and "reverse" positions shuts off the flow of hydraulic fluid to the valve and hence renders the valve inoperative. As a result, the height of the frame with respect to the wheels is made constant, and this feature may be desirable under certain circumstances, as when the frame is transported for relatively long distances on a roadway.

Thus I have provided a control for maintaining a constant depth of penetration of tractor-drawn farm implements into the ground. The control is powered conveniently by the tractor's hydraulic system, and includes a double-acting hydraulic cylinder to both raise and lower the implement frame with respect to the wheels. The cylinder is powered by hydraulic fluid from the tractor supplied through a control valve which in turn is controlled by movement of a ground height-sensing shoe. By reversing the flow of hydraulic fluid from the tractor, the control valve is bypassed and the hydraulic cylinder operates to raise the frame with respect to the ground for transport of the implement, for example, from field to field.

While I have described a preferred embodiment of the present invention, it should be understood that various changes, adaptations, and modifications may be made therein without departing from the spirit of the invention and the scope of the appended claims.

What I claim is:

1. In a wheel-mounted implement frame adapted for mounting to a tractor, the latter having a hydraulic pump and a selector and adapted to provide hydraulic fluid under pressure to a respective first or second tractor hydraulic line in correspondence to movement of the selector to forward or reverse positions and to receive returning hydraulic fluid respectively through the second or first tractor hydraulic line, a control for automatically maintaining the height of a frame-mounted implement with respect to ground level comprising:

a. a double-acting hydraulic cylinder operatively inter-connecting the frame and frame wheels to raise and lower the frame with respect to the frame wheels;

b. a control valve carried by the frame and in flow communication with the first and second tractor hydraulic lines, the valve communicating with the hydraulic cylinder through a pair of valve hydraulic lines and having a movable switch with raise and lower positions respectively communicating the hydraulic fluid in the first tractor hydraulic line through the valve with one or the other of the valve hydraulic lines to raise or lower the frame with respect to the wheels;

c. a ground-sensing shoe movably mounted to the frame to permit vertical movement therebetween and having a lower, ground-contacting portion slidable across the surface of the ground and to move vertically with respect to the frame in response to variations in the height of the frame from the surface of the ground;

d. motion-transmitting means for transmitting vertical movement of the sensing shoe to the valve switch to move the switch between its raise and lower positions; and e. a first bypass line communicating the second tractor hydraulic line through a check valve directly to the one valve hydraulic line, and a second bypass line communicating the other valve hydraulic line directly to the first tractor hydraulic line through a check valve, whereby movement of the selector to the reverse position causes hydraulic fluid to bypass the control valve and to energize the hydraulic cylinder, raising the frame with respect to the wheels.

2. The height control of claim 1 wherein the motion-transmitting means includes a resilient coupling adapted to absorb rapid upward and downward movements of the ground-sensing shoe as may be caused when the shoe encounters a rock or fissure.

3. The height control of claim 2 wherein the movable switch of the control valve has an intermediate position between raise and lower positions directly communicating the first and second tractor hydraulic lines and blocking flow through the valve hydraulic lines.

4. The height control of claim 2 wherein the motion-transmitting means includes upper and lower parallel links pivotally connecting the sensing shoe to the frame and adapted to maintain the shoe in flush orientation with respect to the ground surface.

5. The height control of claim 4 wherein the sensing shoe includes an upstanding shaft rotatively mounted within a sleeve pivotally coupled to the parallel connecting links to permit the shoe to rotate in a substantially horizontal plane so as to maintain orientation with the direction of travel of the implement frame when the frame is propelled by the tractor in a curved path.

6. The height control of claim 4 wherein one of the parallel links includes a motion-transmitting arm and wherein the valve switch includes a connector rod and a compression spring urging the connector rod into contact with the motion-transmitting arm, vertical movement of the sensing shoe being transmitted through the motion-transmitting arm and connecting rod to the valve switch, and the compression spring absorbing momentary movements of the motion-transmitting arm as may be caused by the sensing shoe encountering obstructions or fissures in the surface of the ground.

7. The height control of claim 6 wherein the control valve includes a plurality of facing cavities and wherein the valve switch comprises a plunger moving between opposed valve cavities to selectively communicate valve cavities with one another in response to position of the plunger.

8. The height control of claim 7 wherein the control valve includes a check valve preventing hydraulic fluid flow from the valve to the first tractor hydraulic line.

9. In a farm implement frame adapted for mounting to a tractor, the tractor having a hydraulic pump and a selector and adapted to provide hydraulic fluid under pressure to a first or a second tractor hydraulic line in correspondence to movement of the selector to forward or reverse positions, the returning hydraulic fluid passing through the second or first tractor hydraulic lines, respectively, a control for automatically maintaining the height of a frame mounted implement with respect to ground level comprising:

a. wheels bearing the frame and swingable upwardly and downwardly with respect to the frame;

b. a double-acting hydraulic cylinder coupling the wheels and frame and adapted to swing the wheels downwardly and upwardly to raise and lower the frame with respect to the wheels;

c. a control valve mounted to the frame and in flow communication with the first and second tractor hydraulic lines, the valve communicating with the hydraulic cylinder through a pair of valve hydraulic lines and having a movable switch with raise and lower positions and an intermediate neutral position, the raise and lower positions respectively communicating the hydraulic fluid in the first hydraulic line through the valve with one or the other of the valve hydraulic lines to respectively raise or lower the frame with respect to the wheels, and the neutral position directly communicating the first and second tractor hydraulic lines through the valve;

d. a ground height sensor including a vertically movable ground-sensing shoe adapted to slide across the surface of the ground and having an upstanding shaft, a sleeve in which the upstanding shaft of the shoe is rotatably mounted, upper and lower parallel links pivotally connecting the frame and the sleeve to maintain the shoe in flush orientation with respect to the ground, a motion-transmitting arm connected to a parallel link, a connector rod attached to the valve switch, and a compression spring resiliently coupling the connector rod to the motion-transmitting arm, the connector arm moving the valve switch between raise and lower positions in response to upward and downward movements of the ground-sensing shoe and the compression spring absorbing momentary movements of the sensing shoe as when the latter encounters obstructions or fissures in the ground surface; and e. a first hydraulic bypass line communicating the second hydraulic line directly to the one valve hydraulic line through a check valve and a second hydraulic bypass line communicating the other valve hydraulic line directly to the first tractor hydraulic line through a check valve, whereby movement of the selector to the reverse position causes hydraulic fluid to bypass the control valve and to energize the hydraulic cylinder, raising the implement frame with respect to the wheels.

* * * * *